(12) United States Patent
Pan et al.

(10) Patent No.: US 9,610,608 B2
(45) Date of Patent: Apr. 4, 2017

(54) SELF-ASSEMBLY PATTERNING OF ORGANIC MOLECULES ON A SURFACE

(71) Applicant: UT Battelle, LLC, Oak Ridge, TN (US)

(72) Inventors: Minghu Pan, Knoxville, TN (US); Miguel Fuentes-Cabrera, Knoxville, TN (US); Petro Maksymovych, Knoxville, TN (US); Bobby G. Sumpter, Knoxville, TN (US); Qing Li, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 808 days.

(21) Appl. No.: 13/860,291

(22) Filed: Apr. 10, 2013

(65) Prior Publication Data

US 2013/0264747 A1   Oct. 10, 2013

Related U.S. Application Data

(60) Provisional application No. 61/622,076, filed on Apr. 10, 2012.

(51) Int. Cl.

| | |
|---|---|
| *B05D 3/06* | (2006.01) |
| *B05D 1/18* | (2006.01) |
| *B82Y 30/00* | (2011.01) |
| *B82Y 40/00* | (2011.01) |
| *B05D 3/14* | (2006.01) |

(52) U.S. Cl.
CPC ............... *B05D 3/06* (2013.01); *B05D 1/185* (2013.01); *B82Y 30/00* (2013.01); *B82Y 40/00* (2013.01); *B05D 3/14* (2013.01)

(58) Field of Classification Search
CPC ....................................................... B05D 3/06
See application file for complete search history.

(56) References Cited

U.S. PATENT DOCUMENTS

| | | | |
|---|---|---|---|
| 6,124,963 | A | 9/2000 | Schumaker |
| 7,122,735 | B2 | 10/2006 | Zuppero et al. |
| 7,994,423 | B2 | 8/2011 | Marder et al. |

(Continued)

FOREIGN PATENT DOCUMENTS

| | | |
|---|---|---|
| CN | 101458225 B | 6/2010 |

OTHER PUBLICATIONS

Lauhon et al., "Electronic and vibrational excitation of single molecules with a scanning tunneling microscope", Surface Science 451 (2000), Oct. 1999, p. 219-225.*

(Continued)

*Primary Examiner* — Galen Hauth
(74) *Attorney, Agent, or Firm* — Brinks Gilson & Lione

(57) ABSTRACT

The embodiments disclosed herein include all-electron control over a chemical attachment and the subsequent self-assembly of an organic molecule into a well-ordered three-dimensional monolayer on a metal surface. The ordering or assembly of the organic molecule may be through electron excitation. Hot-electron and hot-hole excitation enables tethering of the organic molecule to a metal substrate, such as an alkyne group to a gold surface. All-electron reactions may allow a direct control over the size and shape of the self-assembly, defect structures and the reverse process of molecular disassembly from single molecular level to mesoscopic scale.

14 Claims, 9 Drawing Sheets

(56) References Cited

U.S. PATENT DOCUMENTS

2012/0061658 A1    3/2012  Forrest et al.

OTHER PUBLICATIONS

Ford et al., "Theoretical study of ethynylbenzene adsorption on Au(111) and implications for a new class of self-assembled monolayer", J. Phys. Chem. B 2005 109, Aug. 2005, p. 20387-20392.*

Reddick et al., "Photon Scanning Tunneling Microscopy", Review of Scientific Instruments 61, Aug. 1990, p. 3669-3677.*

Alemani et al., "Electric Field-Induced Isomerization of Azobenzene by STM", J. Am. Chem. Soc., 128, Oct. 2006, p. 14446-14447.*

Liljeroth et al., "Current-Induced Hydrogen Tautomerization and Conductance Switching of Naphthalocyanine Molecules", Sceince, vol. 317, Aug. 2007, p. 1203-1206.*

Internet page, "Molecular Switches," IBM Research—Zurich, Science & Technology, Nanoscale Science, http://www.zurich.ibm.com/st/atomic_manipulation/switches.html (1 pg.).

Kanuru et al., Sonogashira Coupling on an Extended Gold Surface in vacuo: Reaction of Phenylacetylene with Iodobenzene on Au(111), Department of Chemistry, University of Cambridge, Cambridge, United Kingdom (20 pp.).

Zhang et al., "Homo-Coupling of Terminal Alkynes on a Noble Metal Surface," *Nature Communications*, DOI: 10.1038/ncomms2291, Accepted Nov. 14, 2012, Published Dec. 18, 2012, Macmillan Publishers Limited, www.nature.com/naturecommunications, (8 pp.).

* cited by examiner

SELF-ASSEMBLY PATTERNING OF ORGANIC MOLECULES ON A SURFACE

PRIORITY

This application claims priority to Provisional Patent Application No. 61/622,076, entitled "Electron-Induced Tautomerization for Patterning of Organic Molecules on Solid Surfaces," filed on Apr. 10, 2012, the entire disclosure of which is hereby incorporated by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND

Self-assembled monolayers ("SAMs") form the basis for molecular nanodevices, flexible surface functionalization, and dip-pen nanolithography as a few examples. SAMs may typically be created by a potentially inefficient process that includes thermally driven tethering reactions of the precursor molecules on a surface, followed by a potentially slow and defect-prone molecular reorganization. This thermal activation process may be required for a self-assembly operation.

Alkanethiol SAMs on gold may provide several applications. The three-dimensional ("3D") character of the alkanethiol self-assembled monolayers SAMs may provide such advantages. The properties of the sulfur-anchor group of the alkanethiol molecule may be one example of molecules that work for the transition to a 3D geometry. However, complexity of the sulfur-gold chemistry produces defects within the monolayer. Furthermore, a reliance on thermal fluctuations to drive the tethering reactions reduces the degree of control over the interfacial chemistry, and necessitates non-trivial approaches to nanoscale patterning or substitution reactions within the self-assembled layer.

BRIEF SUMMARY

The embodiments disclosed herein include all-electron control over a chemical attachment and the subsequent self-assembly of an organic molecule into a well-ordered three-dimensional monolayer on a metal surface. In one example, all-electron control may be used over tautomerization for the subsequent self-assembly of phenylacetylene into a well-ordered three-dimensional monolayer on a gold surface. Generally, a reaction of an organic layer on a metal substrate may result in the ordering of the organic layer. The reaction may be as a result of excitation, such as with electrons or photons.

In one embodiment, hot-electron and hot-hole excitation enables chemical attachment of the organic molecule to a metal substrate, such as an alkyne group to a gold surface. All-electron reactions may allow a direct control over the size and shape of the self-assembly, defect structures and the reverse process of molecular disassembly from single molecular level to mesoscopic scale. Accordingly, the embodiments include the accessing and controlling of non-thermal reaction pathways that may lead to unique and controllable self-assembly in supported molecular layers.

DETAILED DESCRIPTION OF THE PREFERRED EMBODIMENTS

Functionalization of metal surfaces with organic molecules may provide new research areas, such as molecular electronics and dip-pen nanolithography. Popular chemistry employed is the chemisorption and subsequent self-assembly of alkanethiols on gold surfaces because of the regular three-dimensional structure of the complete monolayer. It may be necessary to search for an alternative chemical reaction that allows attachment of organic molecules to gold and other surfaces or metal substrates. The overall complexity of the sulfur-gold chemistry produces numerous defects within the monolayer and relying on thermally-activated reactions reduces the degree of control over the interfacial chemistry, and necessitates non-trivial approaches to nanoscale patterning or substitution reactions within the self-assembled layer.

Figure 1:
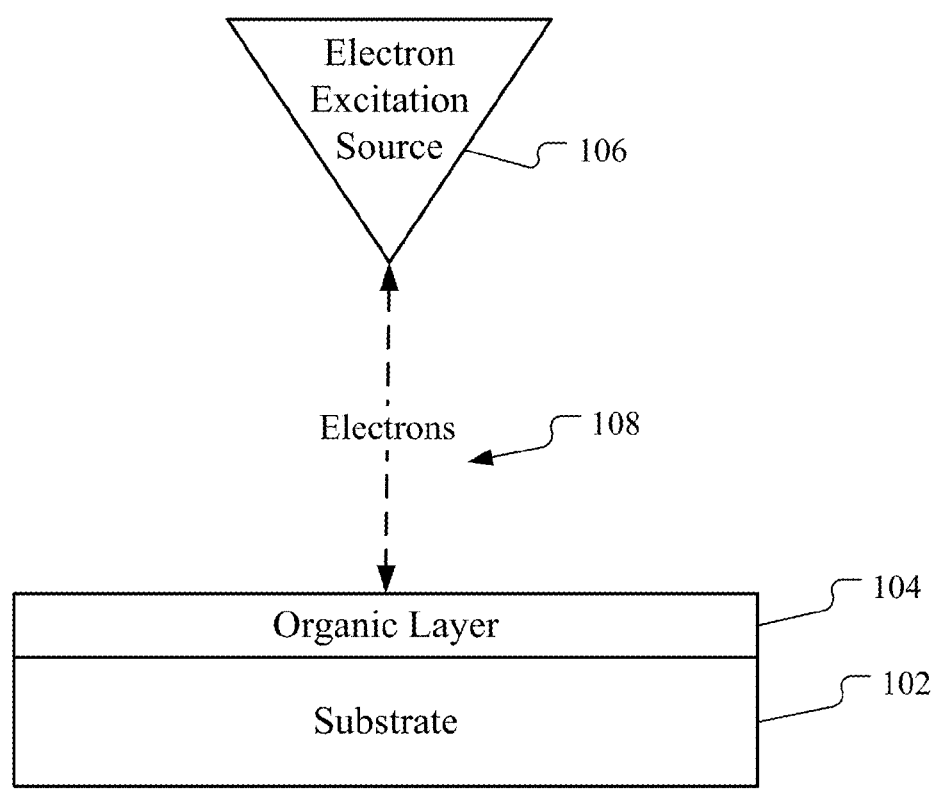
FIG. 1 is a diagram of one embodiment of a system for self-assembly of an organic layer.
Figure 3:
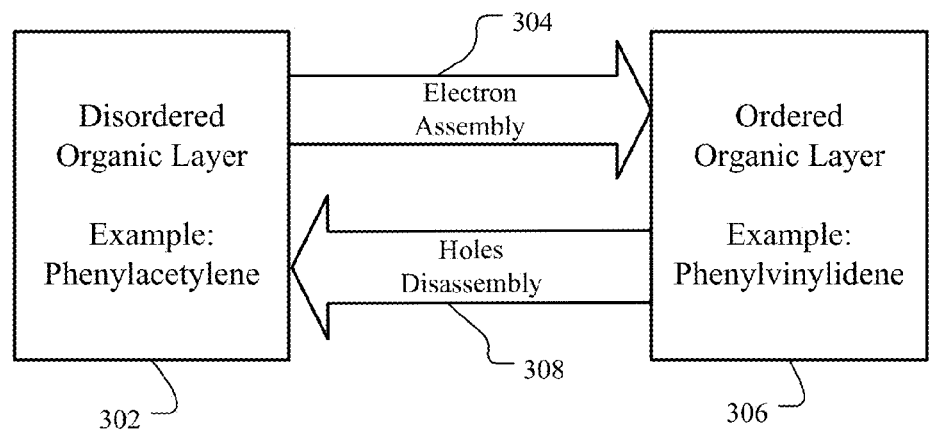
FIG. 3 is a diagram of the assembly and disassembly process.

FIG. 1 is a diagram of one embodiment of a system for self-assembly of an organic layer. FIG. 1 illustrates that electrons 108 can be transmitted or removed from an organic layer 104 on a substrate 102. The substrate 102 may be any number of different metals, including gold, silver, copper, or may be a non-metallic substrate (e.g. silicon). The organic layer 104 may also be referred to as a monolayer when including only a single layer of molecules. In one embodiment, an electron excitation source 106 may be used for transmitting the electrons 104. The electron excitation source 106 may include a scanning tunneling microscope (STM) tip, or local non-thermal excitation source (such as focused electron beam, near-field photoexcitation or localized plasmon excitation). The transmission of electrons 108 may result in hot electron induced reactions, which may be referred to as an assembly process in which an ordered organic layer 104 is formed. Instead of the transmission of electrons 108, holes may be transmitted to the organic layer 104. The transmission of holes may result in hot holes reactions, which may be referred to as a disassembly process in which the organic layer 104 may be disordered. FIG. 3 further illustrates the assembly/disassembly (ordering/disordering) of the organic layer 104. The role of hot electrons and hot-holes may be reversed depending on the specific molecule, as in hot-electrons causing disassembly reaction while hot-holes causing assembly reaction.

Figure 2:
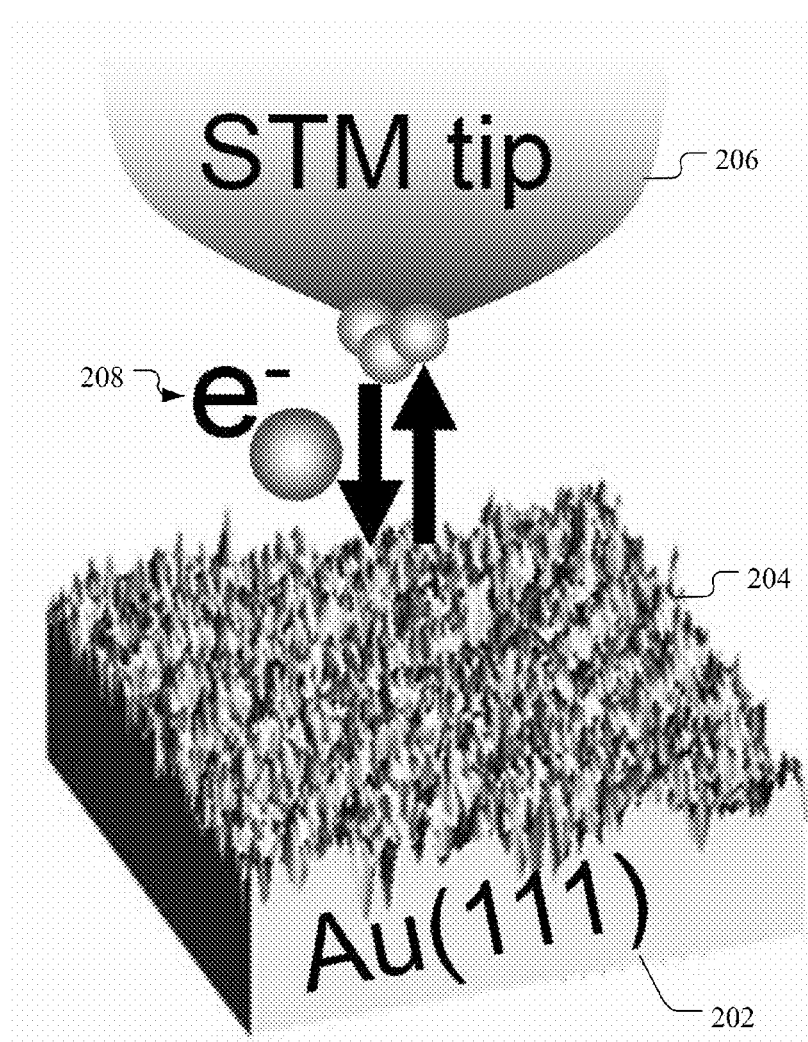
FIG. 2 is a diagram of another embodiment of a self-assembly system.

FIG. 2 is a diagram of another embodiment of the self-assembly system illustrated in FIG. 1. In particular, the substrate 102 may be Au (111) {gold substrate} 202 and the electron excitation source 106 may be the STM tip 202. The transmission of electrons 208 may transition molecules of the organic layer 204 from flat-lying, disordered molecules to a three-dimensional self-assembled monolayer on the gold surface 202. In one embodiment, the organic molecules 204 layered on the gold substrate 202 may be phenylacetylene (see FIG. 4) or phenylvinylidene (see FIG. 5) depending on whether the organic layer 204 is in a disordered or ordered state, respectively. In one embodiment, the STM tip 206 may apply electrons 208 to the phenylacetylene layer which may result in phenylvinylidene, or other derivatives of phenylacetylene that attach to the surface. Alternatively, holes may be added to the substrate for a disassembly/disordering process. In the disassembly process, the organic molecule layer 204 becomes flat-lying and disordered.

When the surface area is scanned by the STM tip 206 with positive sample bias, electron induced reactions may occur. The induced reactions may result in an ordering of the organic layer. In one alternative embodiment, the STM 206 and electrons 208 may be replaced by photons. In other words, photons transmitted on the organic layer 204 may induce the same or similar reactions of the molecules on the organic layer 204 as those reactions described herein that are induced by electrons 208.

The systems illustrated in FIGS. 1-2 are exemplary systems for ordering/assembling molecules on a substrate. The ordering/assembling may be organic molecules on a metal substrate as illustrated in FIG. 1. FIG. 3 is a diagram of the assembly and disassembly process. As used herein, the assembly process may also be referred to as ordering and the disassembly process may be referred to as disordering. FIG. 3 illustrates that electron assembly 304 may transform a disordered organic layer 302 into an ordered organic layer 306. Likewise, a holes disassembly 308 (removal of electrons) may transform an ordered organic layer 306 into a disordered organic layer 302. As described, the transformation may be caused by a reaction of the organic layer. The reaction may be induced through excitation and may be caused by electrons or photons in two examples. Other excitation/induction mechanisms are possible.

The location and shape of the ordered/disordered pattern can be defined by raster-scanning the disordered/ordered organic layer by a STM tip 206 with positive/negative sample bias. In one example, the area of the surface that undergoes a disorder-order transition may be hundreds of square nanometers, accommodating thousands of molecules. Once established, the ordered structure may remain stable for at least a period of time, independent of tunneling conditions or even a presence of the STM tip 206.

In the electron excitation mechanism, the injection of hot electrons causes the molecules to react and self-assemble, while hot holes (supplied by negative sample bias) may cause a controllable disassembly. In this case, the STM tip 206 may not have to raster the image. Instead, hot holes may be injected into the surface from a single position under the tip, and disassembly occurs in a large area surrounding the tip-surface junction.

Figure 4:
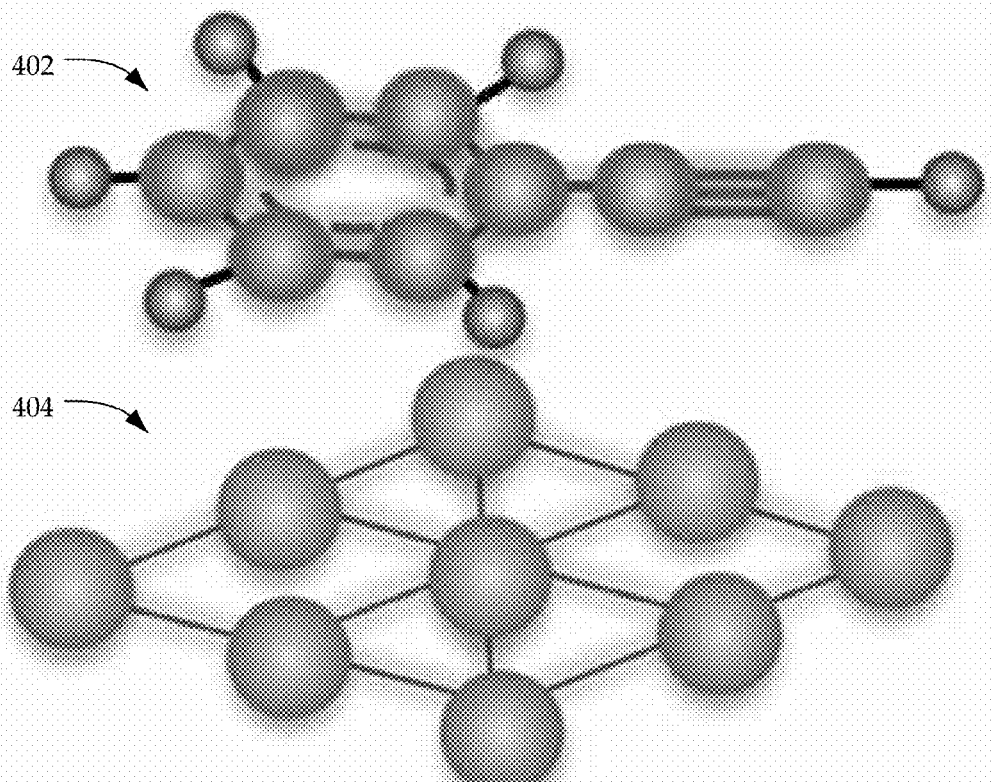
FIG. 4 is one example of a disordered molecule.

FIG. 4 is one example of a disordered molecule (302 in FIG. 3) in the alkyne group. The exemplary disordered molecule shown in FIG. 4 is phenylacetylene. Phenylacetylene is flat-lying as shown in FIG. 4. When subjected to electron induced reactions, the organic layer of phenylacetylene may be converted into phenylvinylidene (FIG. 5) through tautomerization or other derivatives of phenylacetylene that attach to the surface. In alternative embodiments, the disordered to ordered transition reaction may also work for other alkyne derivatives or other organic molecules. As described, the reaction of the organic layer may result in the molecular tails being decoupled from the metal substrate for forming dense packing and enabling subsequent attachment of complex functional molecules to surfaces.

Figure 5:
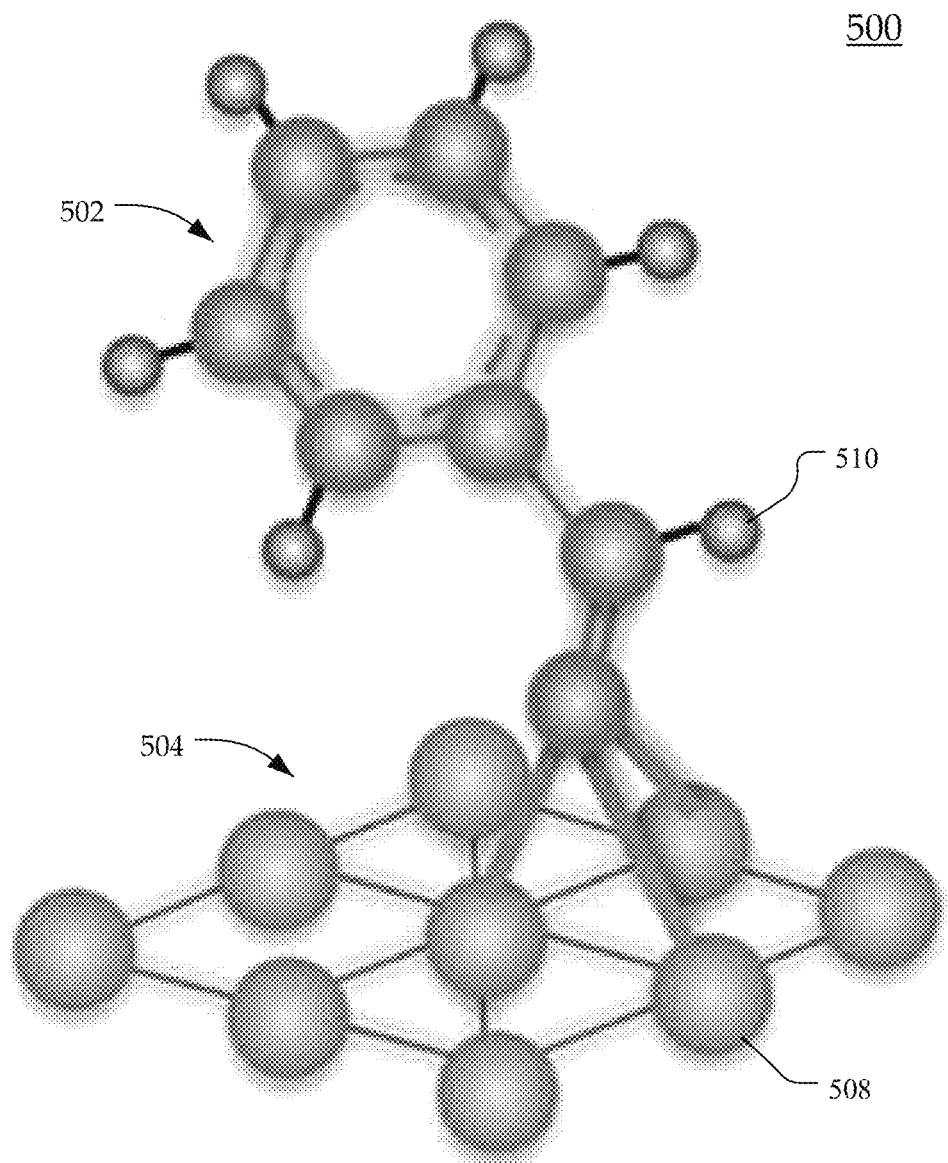
FIG. 5 is one example of an ordered molecule.

FIG. 5 is one example of an ordered molecule (306 in FIG. 3). The exemplary ordered molecule shown in FIG. 5 is phenylvinylidene. Phenylvinylidene may include an upright configuration as shown in FIG. 5. There may be multiple exemplary structures of the reacted alkyne group that tethers phenylacetylene derivatives to the gold surface. The example in FIG. 5 involves tautomerization of the ethyne group, with the proton moving to the C2 position to form a bonded phenylvinylidene.

The electron-induced reaction from a disordered state results in an ordered state with upright configured molecules of the organic layer in one embodiment. This reaction may be through tautomerization in this embodiment. The tautomerization may be found in a number of classes of organic compounds and, as known from the gas-phase, may be triggered with limited energy barrier by electron-attachment. Hot electron reactions thus potentially enable fast, reversible and inherently nanoscale control over the chemistry of the anchor bond in a broad family of compounds including molecules where thermally-activated self-assembly reactions are not available.

Figure 6:
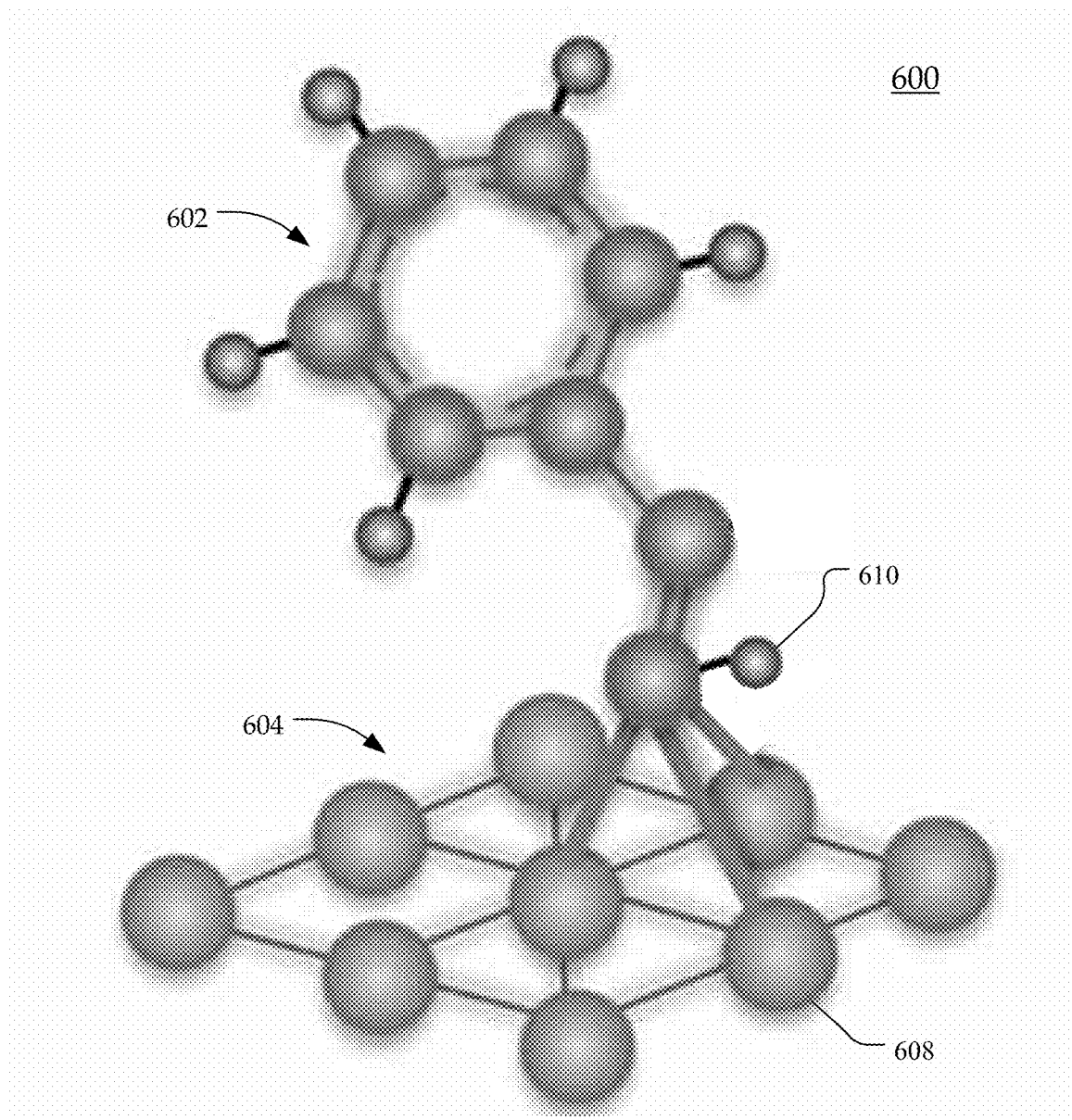
FIG. 6 is another example of an ordered molecule.

FIG. 6 is another example of an ordered molecule. FIG. 6 illustrates an alternative to the phenylvinylidene illustrated in FIG. 5, in which a Hydrogen molecule is located on the base closest to the substrate. FIG. 6 illustrates another upright configuration by which may result from an electron induced reaction of a disordered state. In particular, the ordered molecule may be a single styrene derivative on the metal substrate. There may be multiple exemplary structures of the reacted alkyne group that tethers phenylacetylene derivatives to the gold surface. The example in FIG. 6 involves partial dissociation of the triple bond and bonding with the C—C double bond approximately parallel to the surface ("styrene-derivative").

Figure 7:
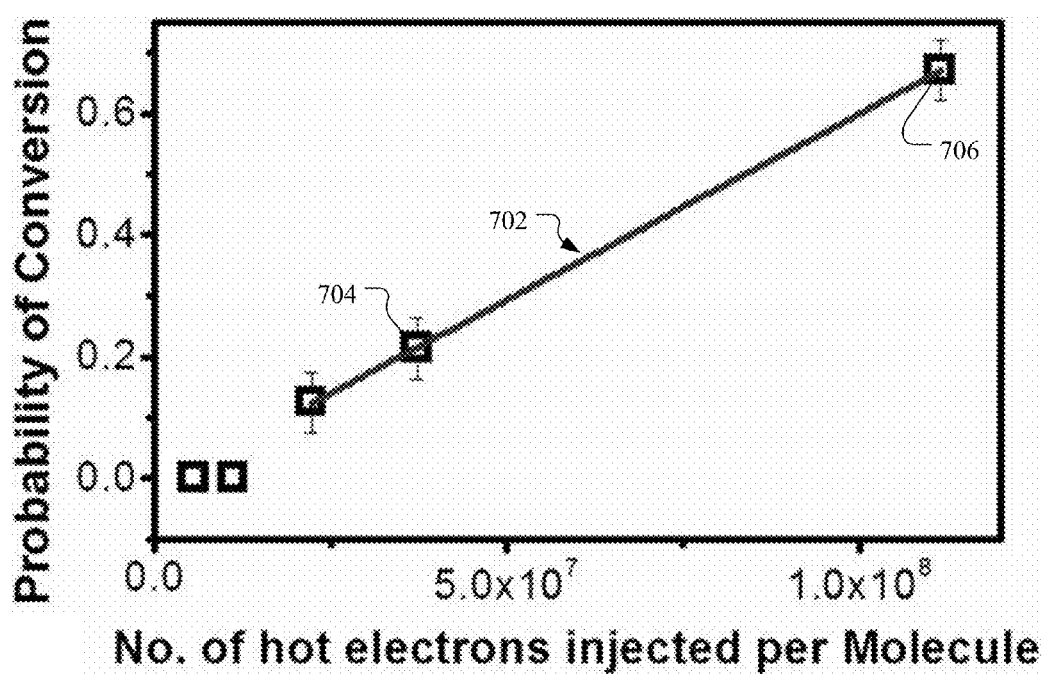
FIG. 7 is a chart of a electrons required for assembly.

FIG. 7 is a chart of electrons required for assembly. Specifically, FIG. 7 illustrates the probability of conversion from the disordered to ordered state as dependent on the number of electrons injected per molecule. The process of building the ordered structure may depend on the scanning speed of the STM tip 206. At an exemplary sample bias of +1 volt (V), the conversion may be negligible at scan speeds exceeding 300 nanometers/second, which may indicate insufficient hot electron injection. FIG. 7 illustrates an investigation of the net assembly yield as a function of scan-rate that results in a linear plot 702 with a slope of $6.1 \times 10^{-9}$ molecule/electron. This may be an estimate for a lower bound for the reaction yield under specific imaging conditions.

In other words FIG. 7 illustrates a threshold number of electrons to be injected to convert from a disordered to an ordered state. At point 704, the probability of conversion is only 20% when $4 \times 10^7$ electrons are injected per molecule. Conversely, at point 706, the probability of conversion exceeds 60% when over $1 \times 10^8$ electrons per molecule are injected. In the example shown in FIG. 7, the tunneling junction was set with a sample bias of +1.6 V and tunneling current of 50 pA.

Figure 8:
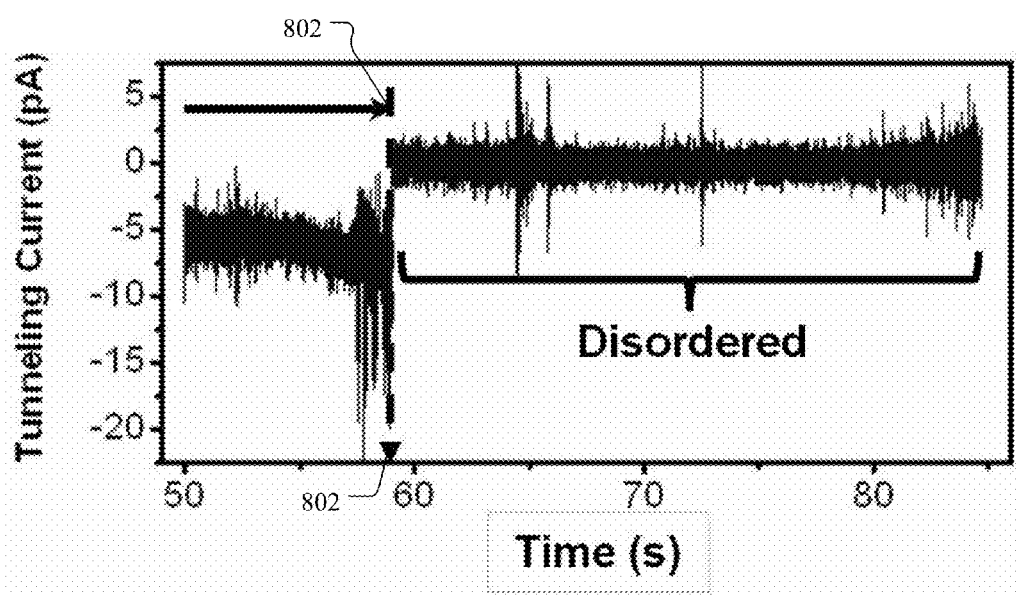
FIG. 8 is a chart of tunneling current and the resulting ordering.

FIG. 8 is a chart of tunneling current and the resulting ordering that illustrates time-dependence of the tunneling current signal during the disassembly process. In particular, an abrupt change of current is shown when the ordered domain disappears. In one example, disassembly may be initiated at the periphery of the ordered structure and proceed inward to the center. Once the disassembling front reaches the tunnel junction at point 802, the tunneling current may drop to zero as illustrated. The plot of recording tunneling current vs. time indicates the conversion of the molecules under the tip. The order-disorder transition may be reversible in the same area of the surface, allowing one to create, erase and recreate the ordered structures simply by varying the tunneling conditions and scan parameters. Furthermore, electron injection may also be used to heal or move defects within the monolayer, suggesting the transition occurs at the single molecular scale. Accordingly, the process described herein provides control over the self-assembly process.

Figure 9:
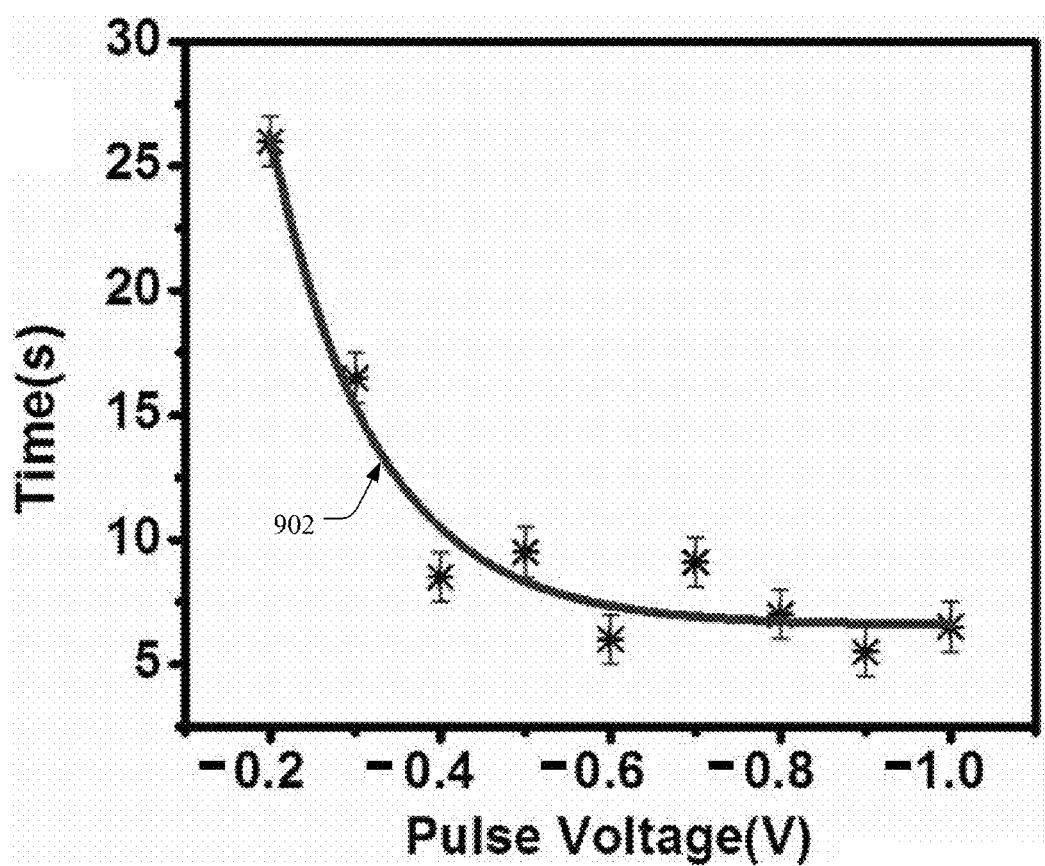
FIG. 9 is a chart of pulse voltage dependence.

FIG. 9 is a chart of pulse voltage dependence. The disassembly/disordering may be through a mechanism of delocalized excitation. The reactions may be induced by reactive electron attachment of hot electrons that propagate via the surface resonances of the metal surfaces. In one example, the molecules disassemble when exposed to the hot-hole current with an energy threshold. FIG. 9 illustrates an example with an energy threshold of about −0.2 eV. The estimated net yield of the reaction may be $6.3 \times 10^{-7}$ molecule per electron, which may be at least two orders of magnitude higher than for the assembly/ordering reaction and consistent with the relevant range for photochemical processes. Accordingly, thousands of molecules in mesoscopic surface areas may be disassembled in a matter of minutes.

In particular, FIG. 9 illustrates pulse voltage dependence of the disassembly time at fixed gap distance ($V_{bias}$=+1 V, $I_{set}$=30 pA). The error bars may account for the scatter in the sizes of the ordered and disordered islands. This dependence may be phenomenologically fitted by exponential decay curve 902 with a threshold of about −0.2 V.

Figure 10:
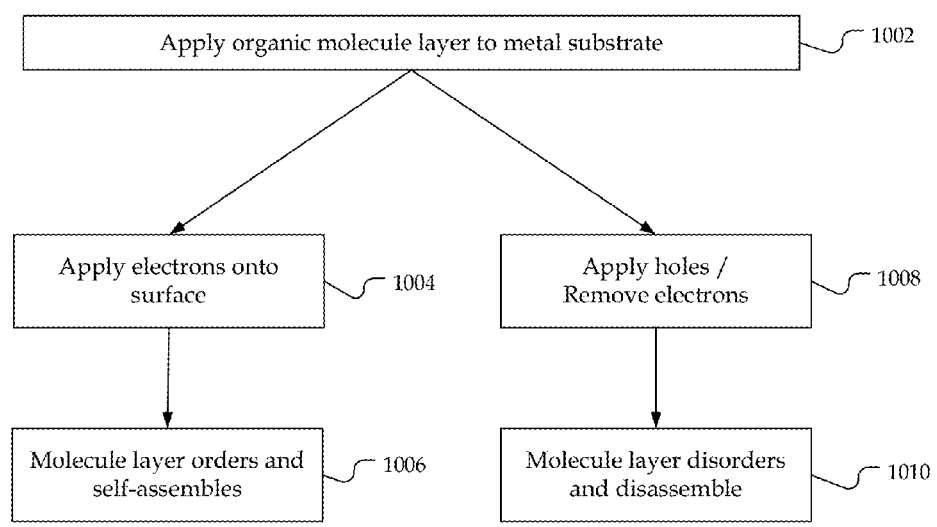
FIG. 10 is a flowchart of the assembly and disassembly process.

FIG. 10 is a flowchart of the assembly and disassembly process. In block 1002, a metal substrate with an organic layer is utilized for the self-assembly process. In blocks 1004 and 1006, electrons (or photons in another embodiment) are applied to the organic molecule layer which orders and self-assembles. In other words, blocks 1004 and 1006 illustrates the assembly/ordering process. Conversely, blocks 1008 and 1010 illustrate the disassembly/disordering process from an ordered organic molecule layer to a disordered organic layer. Rather than applying electrons, holes are applied for the removal of electrons, which may cause the organic molecule layer to become disordered and disassemble.

As described, an all-electron control over a reaction (e.g. tautomerization) and subsequent self-assembly of an organic layer (e.g. phenylacetylene) may result in a well-ordered three-dimensional monolayer on a metal surface (e.g. gold). Electron-induced self-assembly may not change the stoichiometry of the parent phenylacetylene molecule and may not significantly perturb the underlying metal surface, while creating robust and strong chemical bonds at the metal-molecule interface. Electron/hole-induced excitation may allow attachment and assembly of molecules that cannot be attached and assembled by thermal excitation (such as phenylacetylene). The direct control over the anchor bond chemistry may be achieved through electronic excitation and allow for the self-assembly of molecules that do not self-assemble by thermal activation. Further, excitation with light, macroscopic electron beams or a combination of the two may be invoked to gain local and global control over the self-assembly, allowing for new chemical design rules for self-assembly of small and large molecules on demand and in a desired pattern for electronic, photonic and energy applications.

While thermal excitation leads to desorption of this molecule, hot-electron and hot-hole excitation enables tethering of the organic molecule to the metal substrate. In one embodiment, self-assembled monolayers ("SAMs") are generated through electron excitation that enables tethering of an alkyne group to a gold surface. Hot electron induced reactions may provide a feasible pathway to tethering of organic molecules to a metal substrate. The electron-induced pathway may enable control over the self-assembly process, and for switching between self-assembly, disassembly and defect manipulation on-demand.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

What is claimed is:

1. A molecular monolayer self-assembly system comprising:
   a substrate;
   an organic molecule layer disposed on the substrate; and
   an electron excitation source configured to generate an electron-induced reaction of the organic molecule layer that modifies a structure of the organic molecule layer between a flat lying disordered state and a three dimensional ordered state through tautomerization.

2. The system of claim 1 wherein the organic molecule layer in the disordered state comprises phenylacetylene.

3. The system of claim 2 wherein the organic molecule layer in the ordered state comprises phenylvinylidene, or other dissociated modifications of an alkyne group.

4. The system of claim 3 wherein the electron induced reaction that transforms phenylacetylene to phenylvinylidene comprises a reaction that dissociates the alkyne group.

5. The system of claim 1 wherein a transformation from a three dimensional ordered state to a flat lying disordered state is hole induced through removal of electrons.

6. The system of claim 1 wherein the substrate comprises gold.

7. The system of claim 1 wherein the electron excitation source comprises a scanning tunneling microscope tip.

8. A system comprising:
   a metal substrate;
   an organic molecule layer disposed on and in contact with the metal substrate; and
   an electron excitation source configured to induce an excitation reaction of the organic molecule layer that modifies an ordering of the organic molecule layer through tautomerization.

9. The system of claim 8 wherein the excitation reaction is electron induced.

10. The system of claim 8 wherein the excitation reaction is photon induced.

11. The system of claim 8 wherein the ordering comprises a transition between a disordered and an ordered state.

12. The system of claim 11 wherein a transition from the disordered to the ordered state comprises a self assembly of the organic molecule layer.

13. The system of claim 8 wherein the metal substrate comprises gold.

14. The system of claim 8 wherein the electron excitation source comprises a probe tip.

\* \* \* \* \*